(12) United States Patent
Barnes (10) Patent No.: US 10,054,675 B2
(45) Date of Patent: Aug. 21, 2018

(54) ACTIVE COMPENSATION FOR PHASE ALIGNMENT ERRORS IN TIME-OF-FLIGHT CAMERAS

(71) Applicant: ANALOG DEVICES, INC., Norwood, MA (US)

(72) Inventor: Erik D. Barnes, Cambridge, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 371 days.

(21) Appl. No.: 14/876,392

(22) Filed: Oct. 6, 2015

(65) Prior Publication Data

US 2016/0116576 A1 Apr. 28, 2016

Related U.S. Application Data

(60) Provisional application No. 62/068,137, filed on Oct. 24, 2014.

(51) Int. Cl.
*G01S 7/48* (2006.01)
*G01S 7/486* (2006.01)
(Continued)

(52) U.S. Cl.
CPC .......... *G01S 7/4865* (2013.01); *G01S 7/484* (2013.01); *G01S 7/486* (2013.01); *G01S 7/497* (2013.01);
(Continued)

(58) Field of Classification Search
CPC . G01C 3/08; G01S 17/10; G01S 7/484; G01S 7/4865; G01S 7/497
See application file for complete search history.

(56) References Cited

U.S. PATENT DOCUMENTS 7,586,077 B2 9/2009 Lehmann et al.
2009/0020687 A1* 1/2009 Lehmann .............. G01S 7/4816
250/208.1
(Continued)

FOREIGN PATENT DOCUMENTS

DE 10 2012/22329 6/2014
EP 1944622 7/2008
(Continued)

OTHER PUBLICATIONS

Johannes Seiter et al., "Correction of a Phase Dependent Error in a Time-of-Flight Range Sensor", Videometrics, Range Imaging and Applications XII; and Automated Visual Inspection © 2013 SPIE—CCC Code: 0277-786X/13—doi: 10.1117/12.2020493, Proc. of SPIE vol. 8791 87910Y-1, 9 pages.
(Continued)

*Primary Examiner* — Luke D Ratcliffe
(74) *Attorney, Agent, or Firm* — Patent Capital Group (57) ABSTRACT

Methods, apparatuses, and systems can be provided to implement active feedback to electrically sense or monitor the illumination and shutter pulses and adjust them actively to maintain the desired phase relationship/difference between the pulses. By maintaining the desired phase difference, the distance calculation can be made more accurate, even when conditions of the time-of-flight camera varies (e.g., temperature, aging, etc.). Advantageously, active compensation can correct for errors 'on-the-fly', eliminating detailed characterization and manual adjustment during operation.

26 Claims, 6 Drawing Sheets

(51) Int. Cl.

| | | |
|---|---|---|
| *H04N 13/214* | (2018.01) | |
| *G01S 17/10* | (2006.01) | |
| *G01S 17/89* | (2006.01) | |
| *G01S 7/484* | (2006.01) | |
| *G01S 7/497* | (2006.01) | |
| *H04N 5/232* | (2006.01) | |
| *H04N 5/372* | (2011.01) | |
| *H04N 13/02* | (2006.01) | |

(52) U.S. Cl.
CPC .............. *G01S 17/10* (2013.01); *G01S 17/89* (2013.01); *H04N 5/23222* (2013.01); *H04N 5/372* (2013.01); *H04N 13/0214* (2013.01); *H04N 13/214* (2018.05); *G06T 2207/10028* (2013.01); *G06T 2207/30232* (2013.01)

(56) References Cited

U.S. PATENT DOCUMENTS

| | | | |
|---|---|---|---|
| 2009/0045359 | A1 | 2/2009 | Kumahara et al. |
| 2012/0069322 | A1* | 3/2012 | Kostamovaara ...... G01S 7/4865 356/5.01 |
| 2013/0278917 | A1* | 10/2013 | Korekado ................ G01C 3/08 356/5.01 |
| 2013/0333441 | A1 | 12/2013 | Smith et al. |

FOREIGN PATENT DOCUMENTS

| | | |
|---|---|---|
| JP | 2008-102000 | 5/2008 |
| JP | 2009-236650 | 10/2009 |
| JP | 2009-236657 | 10/2009 |
| JP | 2013-195306 | 9/2013 |

OTHER PUBLICATIONS

Juha Kostamovaara et al., "A receiver—TDC chip set for accurate pulsed time-of-flight laser ranging", CDNLive! EMEA 2012, 6 pages.

"Introduction to the Time-of-Flight (ToF) System Design" User's Guide, Texas Instruments, Dec. 2013—Revised May 2014, Literature No. SBAU219D, 32 pages.

Ari Kilpelä et al., "Timing Discriminator for Pulsed Time-of-Flight Laser Rangefinding Measurements", University of Oulu, Finland (retrieved: Oct. 6, 2015), 18 pages.

EP Search Report issued in EP Patent Application Serial No. 15190754.0 dated Mar. 3, 2016, 10 pages.

English Abstract for DE 10 2012/223295.

OA1 issued in JP Patent Application Serial No. 2015-209329 dated Nov. 25, 2016, 9 pages.

English Summary of OA1 issued in JP Patent Application Serial No. 2015-209329 dated Nov. 25, 2016, 7 pages.

* cited by examiner

ACTIVE COMPENSATION FOR PHASE ALIGNMENT ERRORS IN TIME-OF-FLIGHT CAMERAS

PRIORITY DATA

This application is a non-provisional of U.S. Provisional Patent Application Ser. No. 62/068,137, filed Oct. 24, 2014, which is hereby incorporated by reference in its entirety.

TECHNICAL FIELD OF THE DISCLOSURE

The present invention relates to the field of integrated circuits, in particular to circuits configured to provide active compensation for phase alignment errors in time-of-flight cameras.

BACKGROUND

Time-of-flight cameras are optical systems used for measuring distance information about an object. Specifically, time-of-flight cameras resolve distance based on the known speed of light and amount of time it takes for a signal to travel between the camera and the object. One example of such time-of-flight camera is LIDAR, which uses a laser as the light source for measuring distance of an object. Time-of-flight cameras are often found in range finders. Optical systems designed for determining depth, distance, and/or speed can also be found in many other systems, including sports electronics, consumer electronics, medical equipment, aerospace/military equipment, automotive electronics, security systems, etc.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Understanding Time-Of-Flight Cameras

Figure 1:
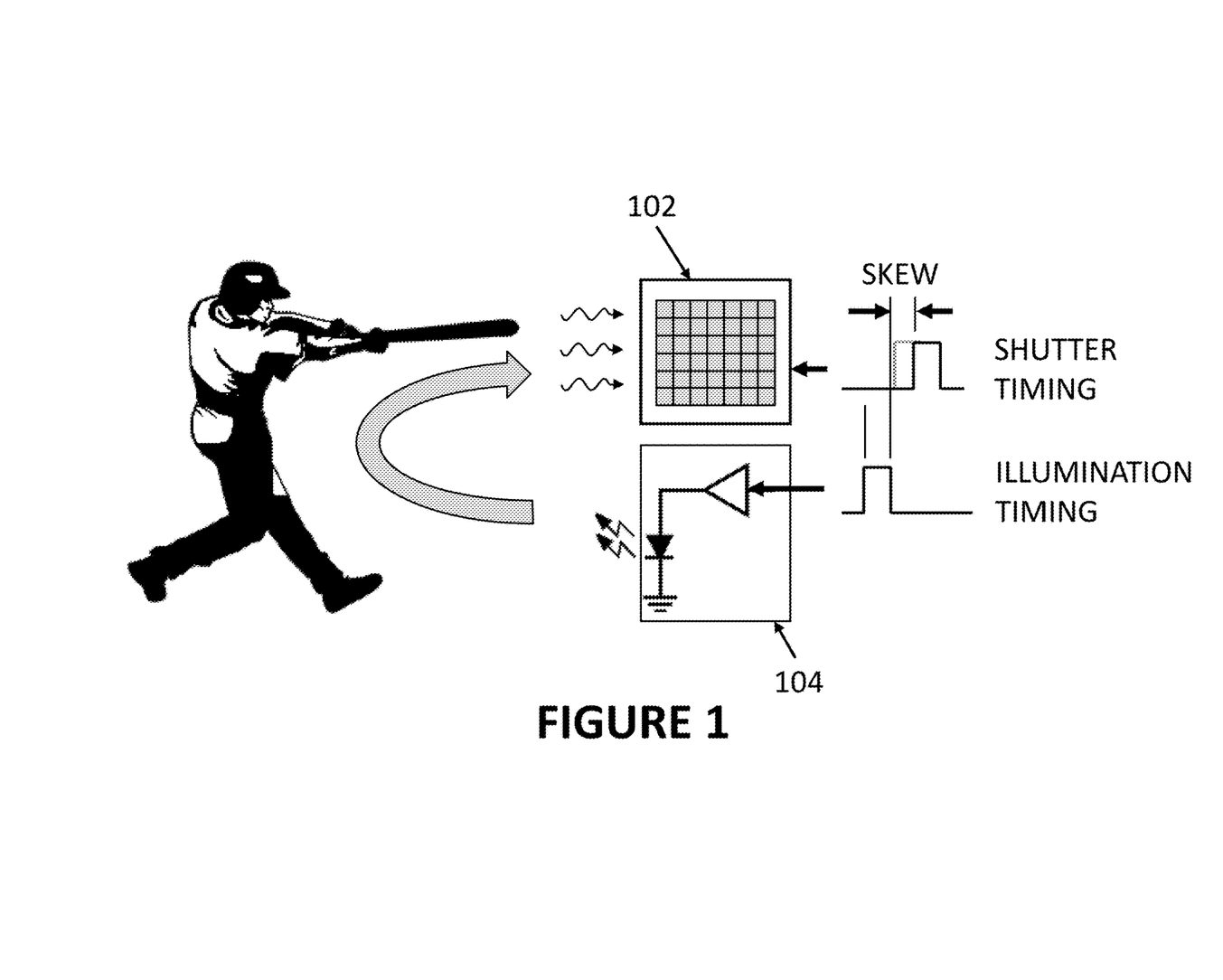
FIG. 1 shows an exemplary time-of-flight camera.

FIG. 1 shows an exemplary time-of-flight camera. The time-of-flight camera generally includes an illuminator 104 (which gives off an active illumination pulse or light pulse), and an image sensor 102 with an electronic shutter. Although not shown, the time-of-flight camera would include a component that can compute the distance of an object in the field of view of the camera (e.g., the baseball player, the baseball bat, etc.). Typically, a time-of-flight camera measures scene depth by generating an active illumination pulse using illuminator 104 that reflects off an object in the scene, and by capturing the reflected light in the image sensor 102. For example, the illuminator 104 can include a light-emitting diode or a laser diode which can pulse infrared light at the object in the scene, and reflected light can be captured by the image sensor 102, e.g., a charge coupled device (CCD) image sensor array or other types of image sensor arrays. The illuminator 104 is driven by an electrical pulse which causes the illuminator 104 to flash. The shutter driver of the image sensor 102 is driven by an electrical pulse which causes the shutter to open to allow an image to be captured and/or an image signal to be generated.

Note that the round trip time of the light traveling from the illuminator 104 to the object and from the object to the image sensor 102 would vary based on the distance of the object from the time-of-flight camera. Also, the speed of light is known. Therefore, depending on the distance between the object to the time-of-flight camera, the reflected light hitting the image sensor 102 would have a delay with respect to the time the illuminator 104 generated the light. Based on this information, it is possible to coordinate the phases of the illuminator 104 and the shutter driver of the image sensor 102 to capture the reflected light. By triggering pulses to the illuminator 104 and image sensor 102 with multiple timing phase differences, those phase differences and captured image signals from the image sensor 102 can be directly used to calculate the distance of the object from the camera. One skilled in the art would appreciate that there are several suitable techniques/algorithms that can be used for the time-of-flight camera to determine distance (e.g., techniques which leverages the known phase difference between the illumination and shutter pulses).

Phase/Timing Errors in Time-Of-Flight Cameras

The predetermined phase difference between the pulse being provided to the illuminator 104 and the pulse being provided to the image sensor 102 is used directly in the determination of the distance of the object from the time-of-field camera. For that reason, accuracy in distance determination can be degraded by timing errors (e.g., offset, skew variation) in the two pulses. The actual phase difference between the two pulses can sometimes be greater than the predetermined/desired phase difference or less than the predetermined/desired phase difference. When the phase difference between the two pulses is inaccurate, the distance calculation also becomes inaccurate. In other words, it is desirable to ensure that the phase difference between the two pulses is known or provided with a high degree of accuracy.

Phrased differently, the accuracy of the depth calculation depends directly on ensuring phase alignment of the illumination and shutter pulses are correct, e.g., reducing the skew (shown in FIG. 1) which can occur when the pulses are not aligned with the desired phase difference. Either or both the illumination and shutter pulses can exhibit skew, which can contribute to errors in the depth calculation. For instance, picoseconds of error in the phase alignment can directly lead to millimeters to centimeters (or more) of error in the depth calculation.

Multiple sources of error exist in the signal chain, both static and dynamic, causing errors in the phase alignment. Some solutions have attempted to address the problem by brute-force techniques to characterize and adjust the timing alignment of the illumination and shutter pulses manually. However, these solutions are not optimal because many of these techniques cannot address the dynamic sources of error easily. For instance, the brute force techniques generally cannot address errors caused by of temperature changes (e.g., leading to voltage supply changes) or aging of the circuitries that generates the pulses.

Active Compensation Technique for Phase Alignment Errors in Time-Of-Flight Cameras To alleviate some of these issues, improved methods, apparatuses, and systems can be provided to implement active feedback to electrically sense or monitor the illumination and shutter pulses and adjust them actively to maintain the desired phase relationship/difference between the pulses. By maintaining the desired phase difference, the distance calculation can be made more accurate, even when conditions of the time-of-flight camera varies (e.g., temperature, aging, etc.). Advantageously, active compensation can correct for errors 'on-the-fly', eliminating detailed characterization and manual adjustment during operation.

Figure 2:
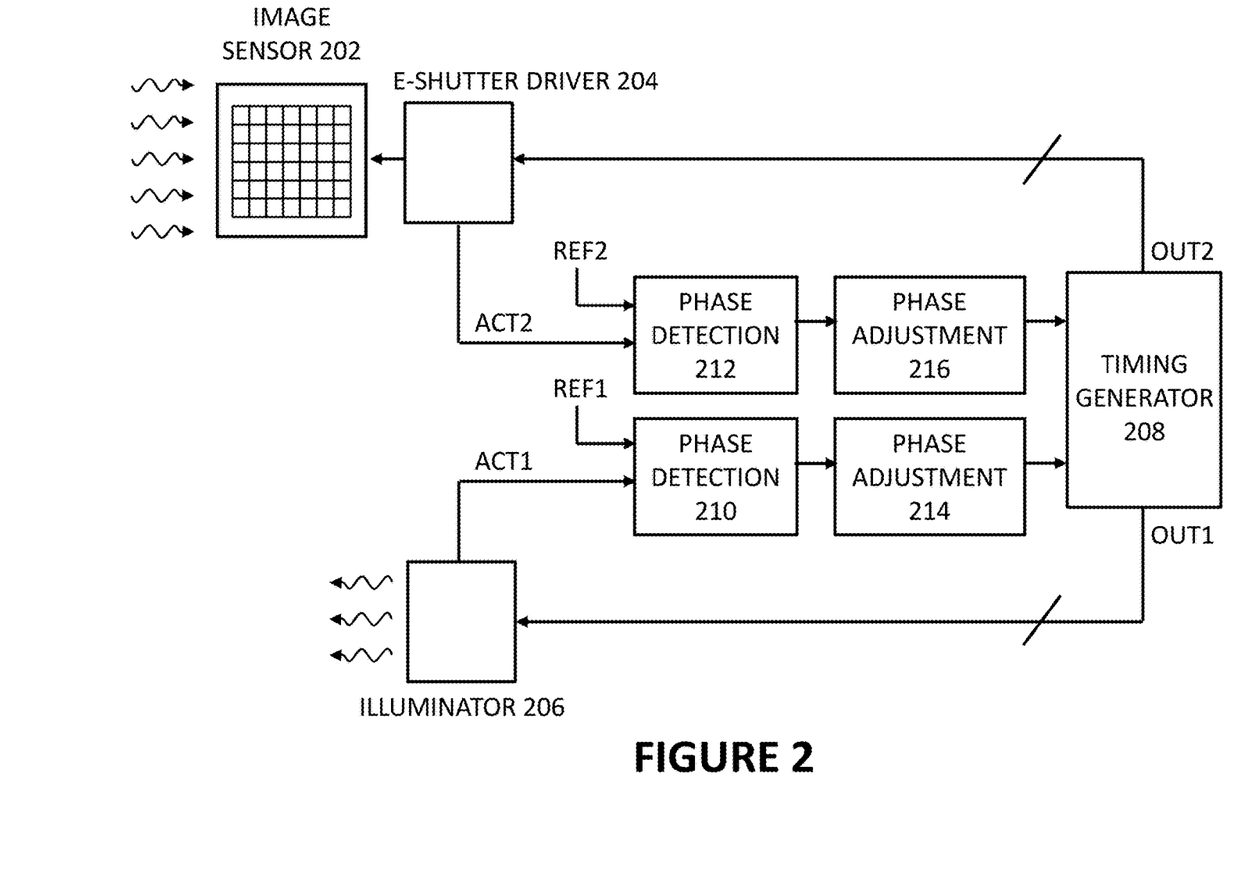
FIG. 2 shows an exemplary system for providing active compensation for phase alignment errors in time-of-flight cameras, according to some embodiments of the disclosure.

FIG. 2 shows an exemplary system for providing active compensation for phase alignment errors in time-of-flight cameras, according to some embodiments of the disclosure. The system shown includes an image sensor 202 (similar to the image sensor 102 of FIG. 1) which may have an electronic shutter driver 204 coupled thereto. Typically, the shutter driver 204 controls the electronic shutter of the image sensor 202. The system also includes illuminator 206 (similar to illuminator 104 of FIG. 1). The illuminator may include a light source, and a driver for driving the light source. The light source can be a light emitting diode, a laser diode, etc., and different kinds of light sources can be used depending on the application. Furthermore, the system includes a (precision) timing generator 208 to generate high speed pulse outputs for the illuminator 206 (OUT1) and shutter driver 204 (OUT2). These two pulses ideally have a desired/known/predetermined phase difference between each other. Captured image signals from the image sensor 202 and the desired/known/predetermined phase differences between the output electrical pulses are used for computing a distance of an object from the time-of-flight system. A processor, such as digital signal processor or microprocessor, can be included in the time-of-flight camera for performing this computation.

As previously explained, the actual phase difference can drift statically and dynamically away from the desired/known/predetermined phase difference, thereby causing the distance determination to become less accurate. One aspect of the present disclosure relates to providing active feedback from the pulses at the shutter driver 204 and illuminator 206, such that the "actual" electrical pulses can be used as feedback information to adjust the pulse outputs OUT1 and OUT2. To obtain the "actual" electrical pulses the shutter driver 204 and illuminator 206, specialized circuitry can be provided to sense the actual electrical pulses at the illuminator 206 (ACT1) and shutter driver 204 (ACT2). The specialized circuitry can include a first sensing circuitry for a first sensing circuitry for sensing a first actual electrical pulse (ACT1) at the driver driving a light source in the illuminator 206, and a second sensing circuitry for sensing a second actual electrical pulse (ACT2) at the electronic shutter driver 204. The specialized circuitry is not trivial, due to the high voltage and high speed conditions of the system in some embodiments. Furthermore, the specialized circuitry is not trivial since the shutter driver 204 and illuminator 206 each have unique circuitries which are very different from each other.

Another aspect of the present disclosure relates to how the active feedback is used to reduce the phase error, or the deviations from the ideal/desired/expected phase difference between the illumination and shutter pulses. The "actual" electrical pulses (e.g., ACT1 and ACT2) are provided as an input to specialized circuitry (e.g., phase detection 210 and phase detection 212) to measure phase difference of the actual pulses with predetermined reference pulses (e.g., REF1 and REF2 respectively). The reference pulses, e.g., REF1 and REF2, can represent the ideal/desired/expected pulses having the known/predetermined phase difference. Phrased differently, the first reference electrical pulse REF1 and the second reference electrical pulse REF2 can represent desired electrical pulses having a predetermined phase difference.

Once the phase difference/error is measured (with respect to the reference pulses), specialized circuitry (e.g., phase adjustment 214 and phase adjustment 216) can implement a phase correction algorithm to adjust the pulse outputs OUT1 and OUT2 being generated by timing generator 208 to drive the phase difference/error to zero between the actual and reference pulses.

In some embodiments, the specialized circuitry can include a first compensation circuitry for adjusting a first output electrical pulse (e.g., OUT1) being provided to the driver driving the light source based on the first actual electrical pulse (e.g., ACT1) and a first reference electrical pulse (e.g., REF1) and a second compensation circuitry for adjusting a second output electrical pulse (e.g., OUT2) being provided to the electronic shutter driver based on the second actual electrical pulse (e.g., ACT2) and a second reference electrical pulse (e.g., REF2). The first compensation circuitry can implement a first phase correction algorithm to adjust the first output electrical pulse (e.g., OUT1) being provided to the illuminator 206 and drive the first actual electrical pulse (e.g., ACT1) closer to the first reference electrical pulse (e.g., REF1). The second compensation circuitry can implement a second phase correction algorithm to adjust a second output electrical pulse (e.g., OUT2) being provided to the shutter driver 204 and drive the second actual electrical pulse (e.g., ACT2) closer to the second reference electrical pulse (e.g., REF2).

One skilled in the art would appreciate that other suitable systems implementing different techniques for measuring errors in phases of the pulses (errors which can contribute to errors in the distance determination) are also envisioned by the disclosure. Different variations of the system are illustrated with FIGS. 3 and 4.

Control Loop for Adjusting Phase of Pulse Outputs

As shown in FIG. 2, the active compensation scheme senses actual electrical pulses and uses the sensed pulses as active feedback to control the output pulses driving the illuminator and shutter driver. Thus, the active compensation scheme can be seen as a control loop, specifically a closed control loop, for driving the output pulses to reduce the phase alignment error of the time-of-flight system. The output pulses are dynamically adjusted based on the respective errors detected by the phase detectors. To ensure stability of the system, the closed control loop can implement a filter which can control how quickly the active compensation scheme corrects for the errors detected by the phase detectors.

Figure 3:
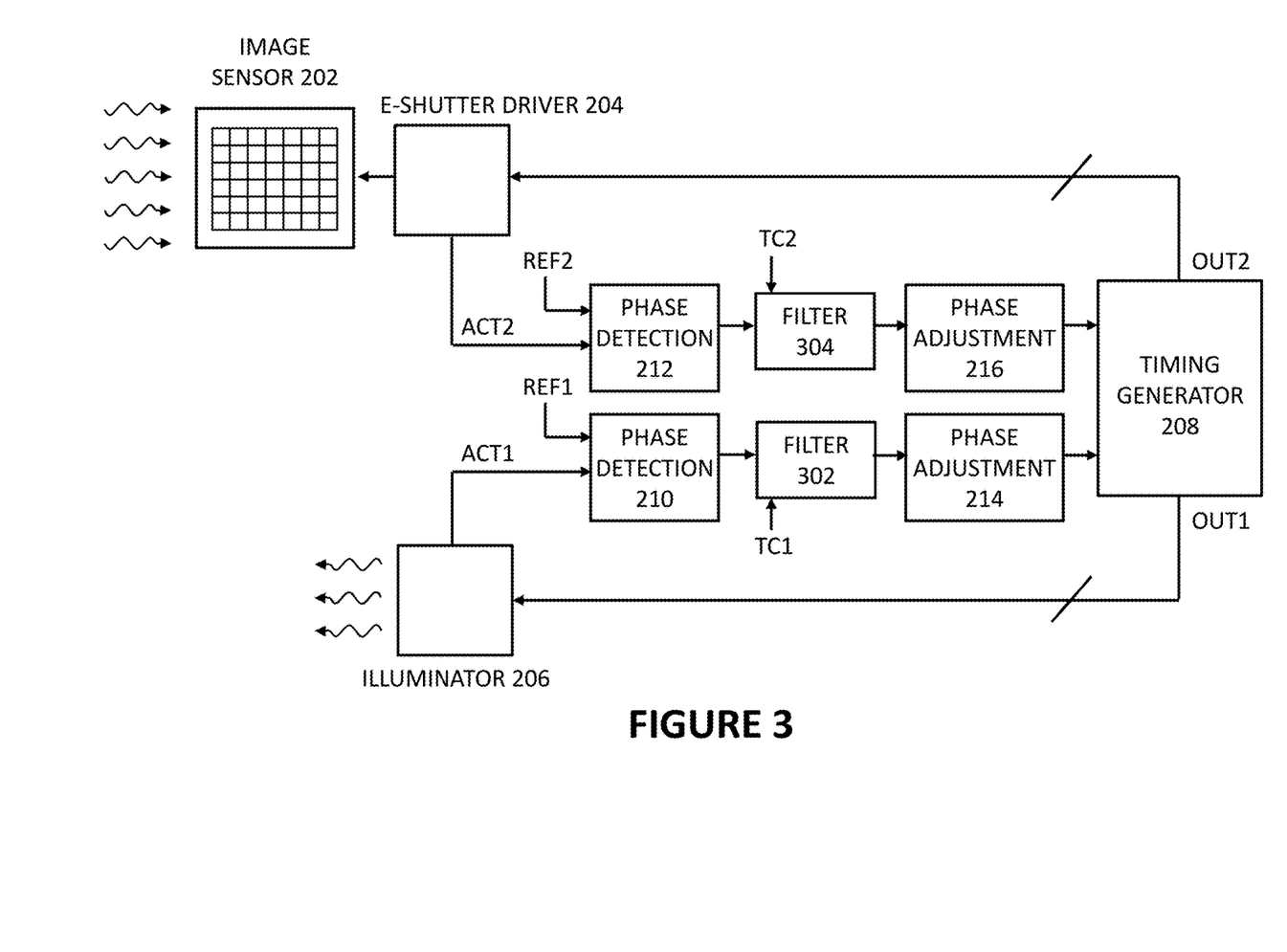
FIG. 3 shows another exemplary system for providing active compensation for phase alignment errors in time-of-flight cameras, according to some embodiments of the disclosure.

FIG. 3 shows another exemplary system for providing active compensation for phase alignment errors in time-of-flight cameras, according to some embodiments of the disclosure. In this example, a first filter 302 is added between phase detection 210 and phase adjustment 214, and a second filter 304 is added between phase detection 212 and phase adjustment 216. The first filter 302 can receive a first time constant TC1; the second filter 302 can receive a second time constant TC2. The first and second time constants can be preprogrammed (e.g., at startup or at factory). In some cases, the first and second time constants can be specified by a user, or specified by other circuitry of the time-of-flight camera.

The filters can average and/or integrate phase detection error outputs (e.g., phase errors) based on respective time constants so that the response time of the closed control loop can be controlled. For example, the filters can, based on the time constant, control how quickly a phase adjustment parameter (used by the phase adjustment 214 and 216 to adjust the timing of the output pulses) is updated each time when the phase error is updated. The filters and time constants advantageously ensure the phase adjustments of the output pulses do not occur too abruptly or quickly (i.e., causing the control loop to oscillate), and ensure the phase adjustments of the output pulses do not occur too slowly. The response time associated with the time constants can be hundreds of nanoseconds to microseconds to millisecond range, for a system where a single pulse period is roughly 100 nanoseconds for the output pulses.

Generalized Control Loop for Generating Pulse Outputs

Figure 4:
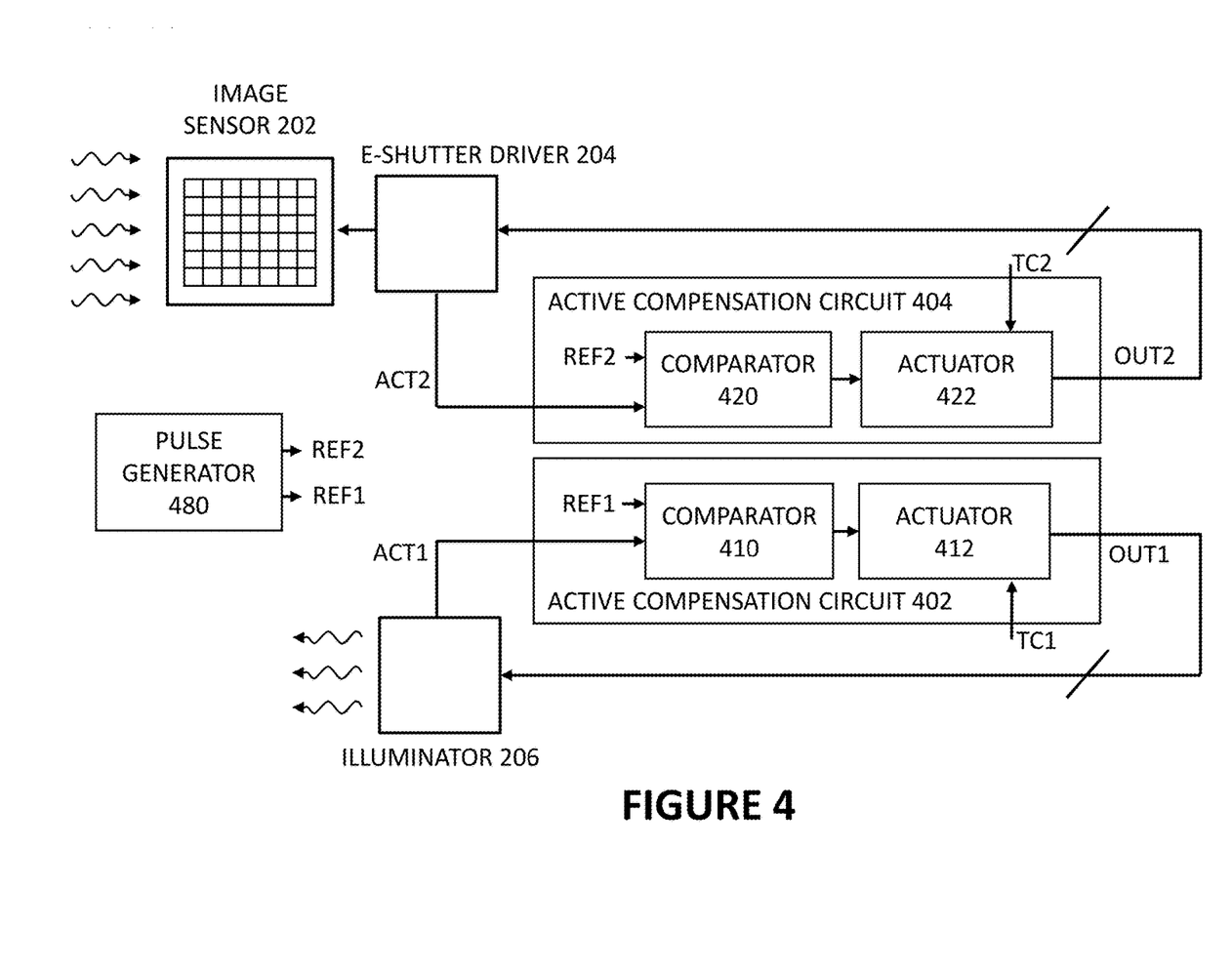
FIG. 4 shows yet another exemplary system for providing active compensation for phase alignment errors in time-of-flight cameras, according to some embodiments of the disclosure.

FIG. 4 shows yet another exemplary system for providing active compensation for phase alignment errors in time-of-flight cameras, according to some embodiments of the disclosure. This illustration shows a model of the control loop used for generating pulse outputs, e.g. OUT1 and OUT2. The system comprises electronic circuitry for active compensation for phase alignment errors in time-of-flight cameras comprising an illuminator 206 and a shutter driver 204. The circuitry includes a first active compensation circuit 402 in a feedback path of a control loop for the illuminator 206. The first active compensation circuit 402 includes a first comparator circuit 410 and a first actuator circuit 412. The circuitry also includes a second active compensation circuit 404 in a feedback path of a control loop for the shutter driver 204. The second active compensation circuit 404 includes a second comparator circuit 420 and a second actuator circuit 422.

The first comparator circuit 410 senses a first actual electrical pulse ACT1 at the illuminator 206 and determines a first phase error between the first actual electrical pulse ACT1 and a first reference electrical pulse REF1. The first phase error can include a first difference in phase or timing between the first actual electrical pulse ACT1 and the first reference electrical pulses REF1. A second comparator circuit 420 senses a second actual electrical pulse ACT1 at the shutter driver 204 and determines a second phase error between the second actual electrical pulse ACT2 and a second reference electrical pulse REF2. The second phase error comprises a second difference in phase or timing between the second actual electrical pulse ACT2 and the second reference electrical pulse REF2. If the first reference electrical pulse REF1 and the second reference electrical REF2 represent two pulses having a desired/ideal/predetermined phase difference, the comparator circuits would determine whether the phase of the actual pulse matches with the reference pulse to determine the phase error.

Based on the first phase error, a first actuator circuit 412 generates a first output electrical pulse OUT1 being provided to the illuminator 206 based on the first phase error; based on the second phase error, a second actuator circuit 422 generates a second output electrical pulse OUT2 being provided to the shutter driver based on the second phase error. The actuator circuit can generate precision timing pulses based on the phase error (if any), and adjusts the phase of the precision timing pulses dynamically based on the phase error so that the phase error can be driven to zero, or reduced. Specifically, the first actuator circuit 412 can adaptively adjust the first output electrical pulse OUT1 being provided to the illuminator 206 to drive the first phase error to zero, and the second actuator circuit 422 can adaptively adjust the second output electrical pulse OUT2 being provided to the shutter driver 204 to drive the second phase error to zero.

To ensure stability and desirable operation of the control loop, the first actuator circuit 412 can include a first programmable time constant TC1 for filtering the first phase error before using the first phase error to adjust the first output electrical pulse, and the second actuator circuit can include a second programmable time constant TC2 for filtering the second phase error before using the second phase error to adjust the second output electrical pulse. The filtering can include averaging and/or integration based on the timing constant.

In some embodiments, the electronic circuitry shown in FIG. 4 further includes a pulse generator 480 configured to generate the first reference electrical pulse REF1 and the second reference electrical pulse REF2 with predetermined timing or phase difference for determining distance information associated with object being illuminated by the illuminator 206.

Exemplary Active Compensation Method

Figure 5:
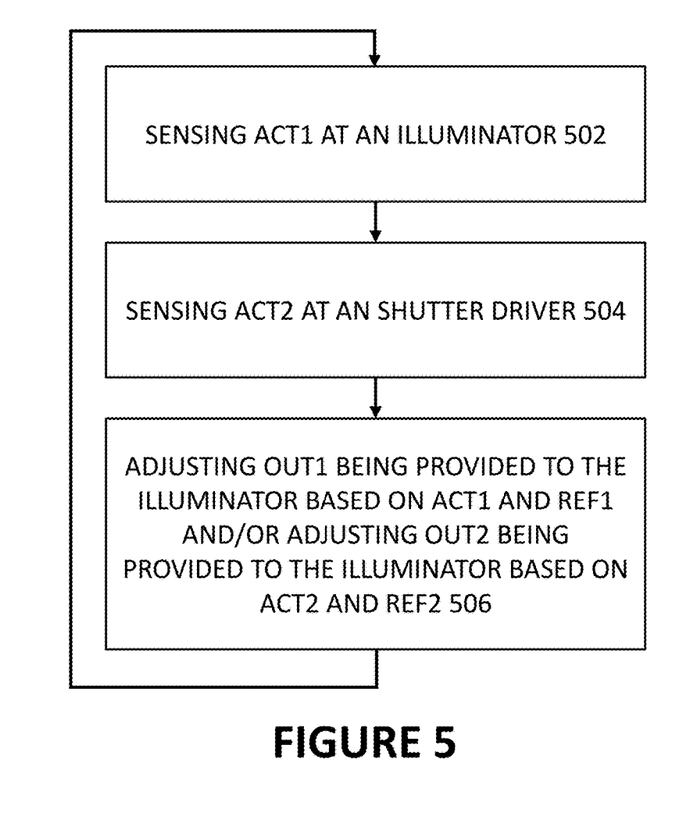
FIG. 5 shows a flow diagram illustrating a method for active compensation of phase alignment errors in time-of-flight cameras, according to some embodiments of the disclosure.

FIG. 5 shows a flow diagram illustrating a method for active compensation of phase alignment errors in time-of-flight cameras comprising an illuminator and a shutter driver, according to some embodiments of the disclosure. The following references to signals correspond to ones described/shown in FIGS. 2-4. The method comprises: sensing a first actual electrical pulse ACT1 at the illuminator (task 502) and sensing a second actual electrical pulse ACT2 at the shutter driver (task 504). The method further includes adjusting one or more of the following (task 506): a first output electrical pulse OUT1 being provided to the illuminator based on the first actual electrical pulse ACT1 and a first reference electrical pulse REF1, and a second output electrical pulse OUT2 being provided to the shutter driver based on the second actual electrical pulse ACT2 and a second reference electrical pulse REF2.

Adjusting the first output electrical pulse OUT1 comprises comparing the first actual electrical pulse ACT1 with the first reference electrical pulse REF1 using a phase detector to determine a first phase error, and adjusting the first output electrical pulse OUT1 for the illuminator based on the first phase error. Adjusting the second output electrical pulse OUT2 comprises: comparing the second actual electrical pulse ACT2 with a second reference electrical pulse REF2 using the phase detector to determine a second phase error, and adjusting the second output electrical pulse OUT2 for the shutter driver based on the second phase error.

In the active compensation scheme, adjusting the first output electrical pulse OUT1 comprises adjusting the first output electrical pulse OUT1 to drive a first phase error between the first actual electrical pulse ACT1 and the first reference electrical pulse REF1 to zero or reduce the first phase error. In some embodiments, adjusting the first output electrical pulse OUT1 comprises: determining a first phase error between the first actual electrical pulse ACT1 and a first reference electrical pulse REF1, and filtering the first phase error according to a first time constant TC1 of a first feedback loop having the first actual electrical pulse ACT1 as a feedback signal before using the first phase error to adjust the first output electrical pulse OUT1.

In a similar fashion, adjusting the second output electrical pulse OUT2 comprises adjusting the second output electrical pulse OUT2 to drive a second phase error between the second actual electrical pulse ACT2 and the second reference electrical pulse REF2 to zero or reduce the second phase error. In some embodiments, adjusting the second output electrical pulse OUT2 comprises: determining a second phase error between the second actual electrical pulse ACT2 and a second reference electrical pulse REF2, and filtering the second phase error according to a second time constant TC2 of a second feedback loop having the second actual electrical pulse ACT2 as a feedback signal before using the second phase error to adjust the second output electrical pulse OUT2.

Exemplary Circuitry for Sensing the Illumination Pulse

Figure 6:
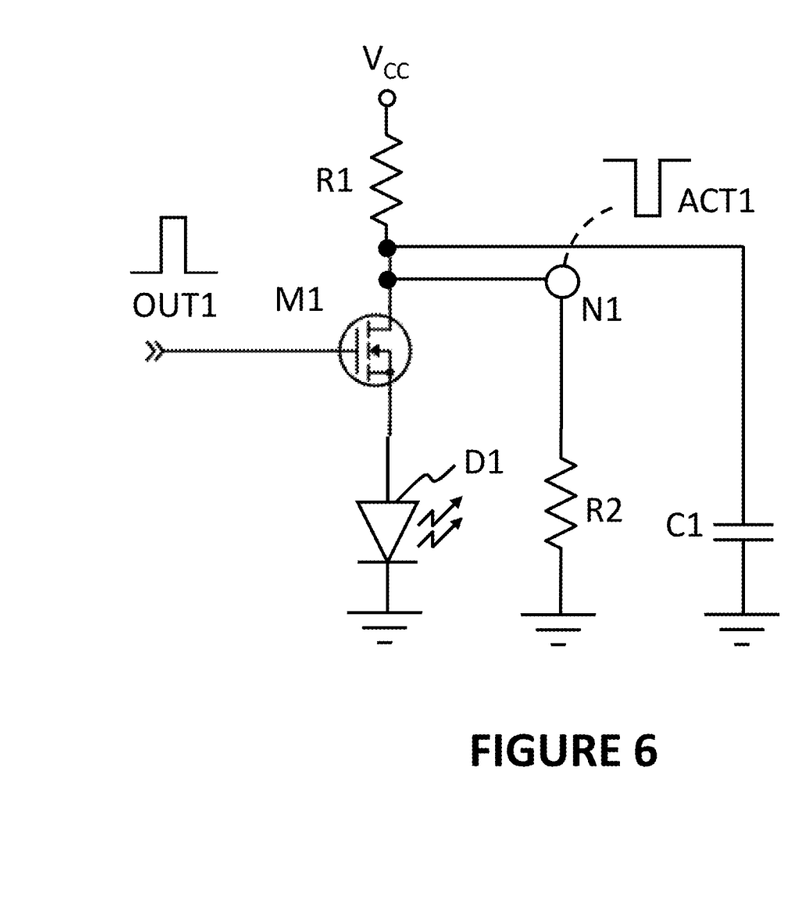
FIG. 6 shows an exemplary illuminator design with an electrical pulse output for feedback, according to some embodiments of the disclosure.

FIG. 6 shows an exemplary illuminator design with an electrical pulse output for feedback, according to some embodiments of the disclosure. The design includes a transistor device M1, whose gate is driven by the pulse output being provided to the illuminator (from a timing generator), e.g., OUT2 of FIGS. 2-4. The illuminator design includes a diode D1 when can give off light for the time-of-flight camera when the diode D1 is on. When the transistor device M1 is off, the capacitor C1 is charged as a reservoir voltage builds up at the positive terminal of the capacitor C1. The voltage at node N1 is also "high". When the pulse (e.g., OUT2) arrives and turns on the transistor device M1 (e.g., a power field-effect transistor), the diode D1 appears like a short (low resistance), and a substantial amount of charge is discharged from the capacitor C1 and dumped as current through the diode D1 and light is emitted by D1.

To sense the actual electrical pulse that is at the illuminator, it is possible to extract the voltage at node N1 to be used as the "actual" electrical pulse at the illuminator, e.g., ACT1 of FIGS. 2-4. When the diode D1 turns on as a result of the pulse provided by the timing generator, voltage at node N1 is pulled down to ground due to the resistive element R2 and the discharging of the capacitor C1. As a result, the voltage at node N1 would have a negative pulse (ACT1) in response to an incoming positive pulse (OUT1). The negative pulse (ACT1) can be used effectively as the active feedback for compensating phase errors.

As illustrated by FIG. 6, the first actual electrical pulse (ACT1) comprises sensing an electrical pulse at a circuit node in the illuminator (e.g., node N1), and the first actual electrical pulse (ACT1) would be representative of a pulse which turns on a light source (e.g., diode D1) in the illuminator. It is envisioned by the disclosure that other circuit architectures can be used for the illuminator design. Depending on the circuit architecture, other suitable nodes can be used for providing the "actual" electrical pulse at the illuminator for the active feedback. It is noted that some nodes can be more accurate in providing the "actual" electrical pulse at the illuminator, whose accuracy is determined by how close the timing of the "actual" or sensed electrical pulse is to the actual time when the diode is turned on. The selection of the node can thus depend on accuracy of the "actual" electrical pulse as well as on the ease of using or coupling to the particular node for providing the "actual" electrical pulse for a given system.

In some embodiments, the sensing the second actual electrical pulse (ACT1) comprises sensing light emitted by a light source in the illuminator using a photo-sensitive element in the illuminator (e.g., a photo diode or a similar photo-sensitive sensor co-located with the light source and driver circuits driving the light source). The photo-sensitive element can generate an electrical pulse as the first actual electrical pulse (ACT1) in response to sensing the light emitted by the light source. The photo-sensitive element is preferably not provided with the image sensor. It is desirable for the photo-sensitive element to be located very near the light source in the illuminator so that a very accurate actual electrical pulse can be generated.

Sample Features

Example 1 is a method for active compensation for phase alignment errors in time-of-flight cameras comprising an illuminator and a shutter driver. The method includes: sensing a first actual electrical pulse at the illuminator; sensing a second actual electrical pulse at the shutter driver; adjusting a first output electrical pulse being provided to the illuminator based on the first actual electrical pulse and a first reference electrical pulse; and adjusting a second output electrical pulse being provided to the shutter driver based on the second actual electrical pulse and a second reference electrical pulse.

Example 2 is a method of Example 1, wherein adjusting the first output electrical pulse comprises: comparing the first actual electrical pulse with the first reference electrical pulse using a phase detector to determine a first phase error; and adjusting the first output electrical pulse for the illuminator based on the first phase error.

Example 3 is a method of Example 1, wherein adjusting the second output electrical pulse comprises: comparing the second actual electrical pulse with a second reference electrical pulse using the phase detector to determine a second phase error; and adjusting the second output electrical pulse for the shutter driver based on the second phase error.

Example 4 is a method according to Example 1, wherein sensing the first actual electrical pulse is performed using the design shown in FIG. 6.

Example 5 is a method according to Example 1, wherein the phase detector is configured to determine a difference in phase or timing between two input signal pulses, or a difference in timing between the two input signal pulses.

Example 6 is a method according to Example 1, wherein adjusting the first output electrical pulse comprises reducing a first phase error between the first actual electrical pulse and a first reference electrical pulse.

Example 7 is a method according to Example 1, wherein adjusting the second output electrical pulse comprises reducing a second phase error between the second actual electrical pulse and a second reference electrical pulse.

Example 8 is an apparatus for active compensation for phase alignment errors in time-of-flight cameras comprising an illuminator and a shutter driver. The apparatus includes: means for sensing a first actual electrical pulse at the illuminator; means for sensing a second actual electrical pulse at the shutter driver; means for adjusting a first output electrical pulse being provided to the illuminator based on the first actual electrical pulse and a first reference electrical pulse; and means for adjusting a second output electrical pulse being provided to the shutter driver based on the second actual electrical pulse and a second reference electrical pulse.

Example 9 is an apparatus according to Example 8, comprising means for implementing any one of Examples 1-7.

Example 10 is an apparatus for active compensation for phase alignment errors in time-of-flight cameras comprising an illuminator and a shutter driver. The apparatus includes: a first sensing circuitry for sensing a first actual electrical pulse at the illuminator; second sensing circuitry for sensing a second actual electrical pulse at the shutter driver; a first compensation circuitry for adjusting a first output electrical pulse being provided to the illuminator based on the first actual electrical pulse and a first reference electrical pulse; and a second compensation circuitry for adjusting a second output electrical pulse being provided to the shutter driver based on the second actual electrical pulse and a second reference electrical pulse.

Example 11 is an apparatus which may further include circuitry for implementing any one of Examples 1-7.

Variations and Implementations

The system shown in FIG. 4 (as well as FIGS. 2-3) illustrates a dynamic and active compensation scheme, which is not to be confused with factory calibration, or brute force solutions. Factory calibration or brute force solutions do not involve measuring the current phase error and actively compensating for such error.

The active compensation scheme can be carried out periodically (where the control loop executes one iteration every period). In some cases, the active compensation scheme can be turned on in response to a signal from a user. In some cases, the active compensation scheme is carried out repeatedly and continuously (during operation in the background).

Some embodiments described herein involve sensing the pulse at the illuminator based on an electrical solution (i.e., sensing an electrical signal in a circuit node in the illuminator), which is to be distinguished from an optical solution (i.e., using a photo-sensitive element to generate the actual electrical pulse). In some cases, an electrical solution is preferable because an electrical solution can obviate the need for having such reference sensors or pixels with the image sensor.

It is also important to note that the embodiments described herein relates to adjusting the phase of both (1) the first output electrical pulse being provided to the illuminator and (2) the second output electrical pulse being provided to the shutter driver. However, it is understood by one skilled in the art that in some embodiments, only one of (1) and (2) is adjusted. It is possible in some cases that one of (1) and (2) does not exhibit significant skew (or is expected to be relatively accurate), and thus the phase is not adjusted. Such embodiments are also envisioned by the disclosure.

The present disclosure is not limited to time-of-flight systems having a single shutter driver/image sensor and single illuminator. Time-of-flight systems can include multiple shutter drivers/image sensors, and/or multiple illuminators. These systems would still suffer from the phase alignment errors described herein. Accordingly, corresponding circuitry can be provided for multiple shutter drivers/image sensors and/or multiple illuminators to reduce and actively compensate for the phase alignment errors.

The implementation of the phase detectors and/or comparator circuits may not be trivial. Circuits and actual electrical pulses in the shutter driver and illuminator can be very different because the shutter driver and the illuminator are very different subsystems (e.g., different voltages, shapes of signals, process technologies, etc.). The actual electrical pulse may not necessarily be the same kind of signal as the reference electrical pulses. Electrically, these differences make it difficult to compare the actual electrical pulses and the reference electrical pulses and extract the phase error between two different kinds of signals. Before the actual electrical pulses are compared against the reference electrical pulses, the actual electrical pulses may be shaped, scaled, adjusted for gain differences, etc. In some cases, the phase detectors and/or comparator circuits are implemented to extract edge information from two very different kinds of input signals to determine the phase error. For instance, the phase detectors and/or comparator circuits can include threshold detectors and logic circuits to extract edge information.

In some embodiments, the reference electrical pulses having the desired phase difference may be generated by a pulse generator or a timing generator. In some other embodiments, an actual electrical pulse of one path in the time-of-flight system can serve as the reference electrical pulse of another path in the time-of-flight system, since absolute timing of the pulses is not important to the accuracy of the time-of-flight system, and it is the relative timing (phase difference) which affects the accuracy of the time-of-flight system. Accordingly, the phase detector and/or comparator circuit can compare the two signals to determine whether the phase difference between the two signals is correct, or is off, or deviates from the ideal phase difference by some phase error. For instance, the second actual electrical pulse at the shutter driver can be used or serve as the first reference electrical pulse being compared against the first actual electrical pulse at the illuminator. In another instance, the first actual electrical pulse at the illuminator can be used or serve as the second reference electrical pulse being compared against the second actual electrical pulse at the shutter driver.

In certain contexts, the features discussed herein can be applicable to many systems where it is desirable to determine a distance of an object. Exemplary systems include sports equipment, military equipment, automotive systems, medical systems, scientific instrumentation, radar, industrial process control, and any suitable systems which can leverage an accurate time-of-flight camera. Moreover, certain embodiments discussed above can be provisioned in technologies for medical imaging, patient monitoring, medical instrumentation, and home healthcare. Other applications can involve automotive technologies for safety systems (e.g., stability control systems, driver assistance systems, braking systems, infotainment and interior applications of any kind). For example, driver assistance systems uses time-of-flight to determine distances of other people, cars, or objects on the road. Accuracy in distance determination can be very important as several centimeters can attribute to collisions. In yet other example scenarios, the teachings of the present disclosure can be applicable in the industrial markets that include process control systems that help drive productivity, energy efficiency, and reliability. In consumer applications, the teachings of the signal processing circuits discussed above can be used for human-machine interfaces, gaming, image processing, auto focus, etc. Described techniques could readily part of smartphones, tablets, security systems, PCs, gaming technologies, virtual reality, simulation training, etc.

In the discussions of the embodiments above, the capacitors, clocks, DFFs, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

While the disclosure/claims describe the implementations using NMOS transistors devices, it is envisioned that complementary configurations using PMOS transistor(s) (p-type metal-oxide semiconductor transistor(s)) or equivalent bipolar-junction transistors (BJTs) can also be replace one or more of the NMOS transistor (or transistor devices) to provide the disclosed voltage buffers. It is understood by one skilled in the art that a transistor device can be generalized as a device having three (main) terminals. Furthermore, it is understood by one skilled in the art that a transistor device, during operation, can have a characteristic behavior of transistors corresponding to devices such as NMOS, PMOS, NPN BJT, PNP BJT devices (and any other equivalent transistor devices). For instance, the present disclosure/claims encompasses implementations where all NMOS devices are replaced by PMOS devices. The circuits using PMOS devices would be configured in an "upside-down" manner compared to the ones disclosed herein using NMOS devices (V+ and ground are swapped). Varied implementations are equivalent to the disclosed implementations using NMOS transistors devices because the varied implementations would perform substantially the same function in substantially the same way to yield substantially the same result.

Complementary or equivalent configurations (using BJTs in place of NMOS transistors) would be considered interchangeable with embodiments described herein using NMOS transistors to a person with ordinary skill in the art. For instance, when the disclosure/claims mention a "drain" of a metal-oxide field effect transistor (MOSFET) device, the disclosure/claims also envisions an equivalent implementation where the "drain" corresponds to the "collector" of a BJT. The same goes for "source" of a MOSFET corresponding to the "emitter" of a BJT, and for the "gate" of a MOSFET corresponding to the "base" of a BJT. A "source follower" device can correspond to an "emitter follower" device, and so on.

Parts of various apparatuses for active compensation for phase errors in time-of-flight cameras can include specialized electronic circuitry to perform the functions described herein. In some cases, one or more parts of the apparatus can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described herein by executing one or more instructions stored on a non-transitory computer medium.

In one example embodiment, any number of electrical circuits of the FIGURES may be implemented on a board of an associated electronic device. The board can be a circuit board created for time-of-flight systems, and the circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the active compensation functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims (if any). The specifications apply only to one non-limiting example and, accordingly, they should be construed as such. In the foregoing description, example embodiments have been described with reference to particular processor and/or component arrangements. Various modifications and changes may be made to such embodiments without departing from the scope of the disclosure or the scope of the appended claims (if any). The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions or method steps related to active compensation of phase errors, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the disclosure, or the scope of the appended claims (if any). Note that all optional features of the apparatus described above may also be implemented with respect to the method or process described herein and specifics in the examples may be used anywhere in one or more embodiments.

What is claimed is:

1. A method for active compensation of phase alignment errors in time-of-flight cameras comprising an illuminator and a shutter driver, the method includes:
   sensing a first actual electrical pulse at the illuminator;
   sensing a second actual electrical pulse at the shutter driver; and
   adjusting a gain of at least one of the first actual electrical pulse and the second actual electrical pulse prior to comparing the first and second actual electrical pulses against a first and second reference electrical pulses respectively; and
   adjusting one or more of the following:
      a first output electrical pulse being provided to the illuminator based on the comparing of the first actual electrical pulse and the first reference electrical pulse; and
      a second output electrical pulse being provided to the shutter driver based on the comparing of the second actual electrical pulse and the second reference electrical pulse.

2. The method of claim 1, wherein adjusting the first output electrical pulse comprises:
   comparing the first actual electrical pulse with the first reference electrical pulse using a phase detector to determine a first phase error; and
   adjusting the first output electrical pulse for the illuminator based on the first phase error.

3. The method of claim 1, wherein adjusting the second output electrical pulse comprises:
   comparing the second actual electrical pulse with a second reference electrical pulse using a phase detector to determine a second phase error; and
   adjusting the second output electrical pulse for the shutter driver based on the second phase error.

4. The method of claim 1, wherein sensing the first actual electrical pulse comprises sensing an electrical pulse at a circuit node in the illuminator, and the first actual electrical pulse is representative of a pulse which turns on a light source in the illuminator.

5. The method of claim 1, wherein sensing the first actual electrical pulse comprises:
   sensing light emitted by a light source in the illuminator using a photo-sensitive element in the illuminator; and
   generating, by the photo-sensitive element, an electrical pulse as the first actual electrical pulse in response to sensing the light emitted by the light source.

6. The method of claim 1, wherein adjusting the first output electrical pulse comprises adjusting the first output electrical pulse to drive a first phase error between the first actual electrical pulse and the first reference electrical pulse to zero or reduce the first phase error.

7. The method of claim 1, wherein adjusting the first output electrical pulse comprises:
   determining a first phase error between the first actual electrical pulse and a first reference electrical pulse; and
   filtering the first phase error according to a first time constant of a first feedback loop having the first actual electrical pulse as a feedback signal before using the first phase error to adjust the first output electrical pulse.

8. The method of claim 1, wherein adjusting the second output electrical pulse comprises adjusting the second output electrical pulse to drive a second phase error between the second actual electrical pulse and the second reference electrical pulse to zero or reduce the second phase error.

9. The method of claim 1, wherein adjusting the second output electrical pulse comprises:
   determining a second phase error between the second actual electrical pulse and a second reference electrical pulse; and
   filtering the second phase error according to a second time constant of a second feedback loop having the second actual electrical pulse as a feedback signal before using the second phase error to adjust the second output electrical pulse.

10. Circuitry for active compensation for phase alignment errors in time-of-flight cameras comprising an illuminator and a shutter driver, the circuitry comprising:
   a first comparator circuit for sensing a first actual electrical pulse at the illuminator and determining a first phase error between the first actual electrical pulse and a first reference electrical pulse;
   a second comparator circuit for sensing a second actual electrical pulse at the shutter driver and determining a second phase error between the second actual electrical pulse and a second reference electrical pulse;
   wherein the first comparator circuit and the second comparator circuit include a threshold detector and logic circuit to extract edge information;
   a first actuator circuit for generating a first output electrical pulse being provided to the illuminator based on the first phase error; and
   a second actuator circuit for generating a second output electrical pulse being provided to the shutter driver based on the second phase error.

11. The circuitry of claim 10, wherein:
   the first phase error comprises a first difference in phase or timing between the first actual electrical pulse and the first reference electrical pulse.

12. The circuitry of claim 10, wherein:
the second phase error comprises a second difference in phase or timing between the second actual electrical pulse and the second reference electrical pulse.

13. The circuitry of claim 10, wherein:
the first actuator circuit includes a first programmable time constant for filtering the first phase error before using the first phase error to adjust the first output electrical pulse.

14. The circuitry of claim 10, wherein:
the second actuator circuit includes a second programmable time constant for filtering the second phase error before using the second phase error to adjust the second output electrical pulse.

15. The circuitry of claim 10, wherein:
the first actuator circuit adaptively adjusts the first output electrical pulse being provided to the illuminator to drive the first phase error to zero; and
the second actuator circuit adaptively adjusts the second output electrical pulse being provided to the shutter driver to drive the second phase error to zero.

16. The circuitry of claim 10, further comprising:
a pulse generator configured to generate the first reference electrical pulse and the second reference electrical pulse with predetermined timing for determining distance information associated with object being illuminated by the illuminator.

17. A time-of-flight system with active compensation for phase alignment error, the time-of-flight system comprising:
a driver driving a light source;
an electronic shutter driver driving an electronic shutter for an image sensor;
a first sensing circuitry for sensing a first actual electrical pulse at the driver driving the light source;
a second sensing circuitry for sensing a second actual electrical pulse at the electronic shutter driver;
a first compensation circuitry for adjusting a first output electrical pulse being provided to the driver driving the light source based on the first actual electrical pulse and a first reference electrical pulse; and
a second compensation circuitry for adjusting a second output electrical pulse being provided to the electronic shutter driver based on the second actual electrical pulse and a second reference electrical pulse;
wherein:
captured image signals from the image sensor and predetermined phase differences associated with the first and second output electrical pulses are used for computing a distance of an object from the time-of-flight system; and
the first sensing circuitry and the second sensing circuitry include a threshold detector and logic circuit to extract edge information.

18. The time-of-flight system of claim 17, wherein the second actual electrical pulse serves as the first reference electrical pulse.

19. The time-of-flight system of claim 17, wherein the first actual electrical pulse serves as the second reference electrical pulse.

20. The time-of-flight system of claim 17, wherein:
the first reference electrical pulse and the second reference electrical pulse represent desired electrical pulses having a predetermined phase difference;
the first compensation circuitry adjust the first output electrical pulse being provided to the light source and drives the first actual electrical pulse closer to the first reference electrical pulse; and
the second compensation circuitry adjusts a second output electrical pulse being provided to the electronic shutter driver and drives the second actual electrical pulse closer to the second reference electrical pulse.

21. The method of claim 1, wherein the second actual electrical pulse is used as the first reference electrical pulse.

22. The method of claim 1, wherein the first actual electrical pulse is used as the second reference electrical pulse.

23. The time-of-flight system of claim 17, wherein the image sensor is a charge coupled device image sensor array.

24. The method of claim 1, wherein the comparing comprises:
extracting edge information using a threshold detector and logic circuit.

25. The method of claim 1, further comprising:
shaping at least one of the first actual electrical pulse and the second actual electrical pulse prior to comparing the first and second actual electrical pulses against the first and second reference electrical pulses respectively.

26. The method of claim 1, further comprising:
scaling at least one of the first actual electrical pulse and the second actual electrical pulse prior to comparing the first and second actual electrical pulses against the first and second reference electrical pulses respectively.

* * * * *